United States Patent [19]
Mattson, Jr.

[11] Patent Number: 6,101,326
[45] Date of Patent: Aug. 8, 2000

[54] METHOD AND APPARATUS FOR FRAME ELIMINATION FOR SIMPLE PROCEDURES WITH TAIL CALLS

[75] Inventor: James S. Mattson, Jr., Campbell, Calif.

[73] Assignee: Hewlett-Packard Company, Palo Alto, Calif.

[21] Appl. No.: 08/865,565

[22] Filed: May 29, 1997

[51] Int. Cl.$^7$ ...................................................... G06F 9/45
[52] U.S. Cl. ............................................................ 395/709
[58] Field of Search .................................. 395/704, 709, 395/705, 680, 580, 590, 701

[56] References Cited

U.S. PATENT DOCUMENTS

| | | | |
|---|---|---|---|
| 5,371,891 | 12/1994 | Gray et al. ............................. | 395/705 |
| 5,481,708 | 1/1996 | Kukol ..................................... | 395/709 |
| 5,522,072 | 5/1996 | De Bruler .............................. | 395/684 |
| 5,590,332 | 12/1996 | Baker ..................................... | 395/705 |
| 5,659,754 | 8/1997 | Grove et al. ........................... | 395/709 |
| 5,794,041 | 8/1998 | Law et al. .............................. | 395/701 |

*Primary Examiner*—Tod B. Swann
*Assistant Examiner*—Matthew Smithers

[57] ABSTRACT

The invention relates to a method and apparatus for stack frame elimination for simple procedures with tail calls. Subject to certain prerequisite constraints, the invention modifies the procedure by converting all tail calls to direct branches. The code in the computer program for constructing and deconstructing the stack frame is eliminated. In a preferred embodiment of the invention, dead code elimination is performed on unreachable code. In an alternative, equally preferred embodiment, dead code is retained in the computer program.

12 Claims, 6 Drawing Sheets

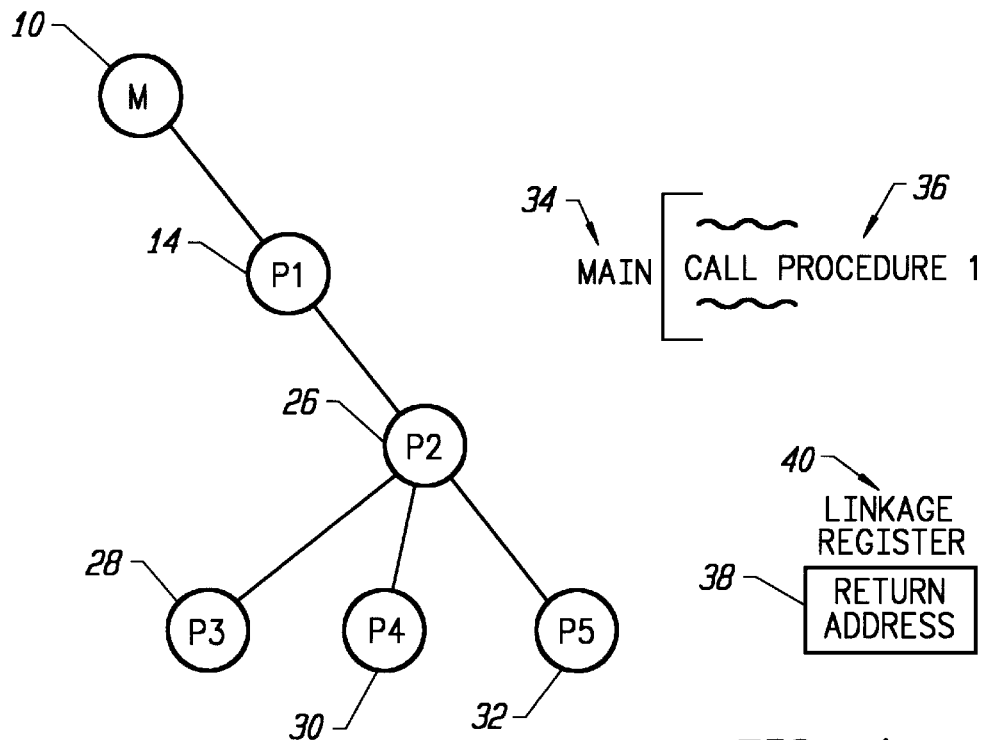
FIG. 3
FIG. 4
(PRIOR ART)
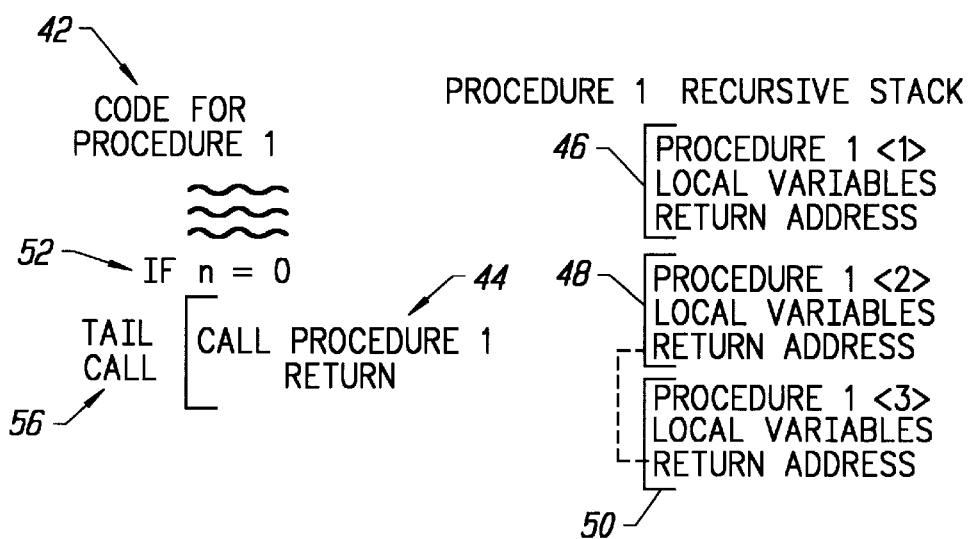
FIG. 5
(PRIOR ART)

```
                136 ⬉        ⬈ 138
                PROCEDURE 1 (INT A)
                    {
             140 ⎯⎯ IF (A = = 0)
             142 ⎯⎯⎯⎯ RETURN PROCEDURE 2(A+1);
                    ELSE
             144 ⎯⎯⎯⎯ RETURN PROCEDURE 2(A-1);
                    }
```

METHOD AND APPARATUS FOR FRAME ELIMINATION FOR SIMPLE PROCEDURES WITH TAIL CALLS

BACKGROUND OF THE INVENTION

1. Technical Field

The invention relates to computer compilers. More particularly, the invention relates to a method and apparatus for optimizing computer procedures.

2. Description of the Prior Art

In a procedure-based computer programming language, a procedure is a series of instructions implementing a particular action. When invoked, a procedure typically initiates the building of a construct known as a stack frame. A stack frame stores local variables and other invocation-specific information, such as a return location.

A procedure can call upon one or more other procedures, known as sub-routines, to be executed. Such a procedure is known as a non-terminal procedure. A stack frame is always generated for a non-terminal procedure.

In some cases, the stack frame serves only to maintain the call/return chain. The call/return chain is the designation for the flow of control among the procedures of a program. Procedure calls can be nested as desired in the program. For example, a first procedure may call a second procedure, which builds its own stack frame. The stack may grow in this manner until some procedure completes execution and returns to its caller.

FIG. 1 is a diagram of code showing a procedure call, according to the prior art. A routine "Main" 10 is initially called. This routine builds a stack frame 12. Main, in turn, calls "Procedure 1" 14. The Procedure 1 stack frame 16 includes local variables for the procedure, and invocation-specific information, including the return address 18 to the Main routine. After Procedure 1 executes, this return address directs the program to return to the point directly after the call to Procedure 1 (statement 20).

FIG. 2 is a stack layout diagram, according to the prior art. In the diagram, the stack 24 includes the stack frames 12, 16 for Main and for Procedure 1, respectively. The stack frame for Main stores the local variables 20 and other invocation-specific information for the Main routine. The stack frame 16 built for Procedure 1 stores not only the Procedure 1 local variables 22, but also a pointer to the address in Main to which the program returns when Procedure 1 completes.

When Procedure 1 finishes, it deconstructs its stack frame 16. The stack pointer is moved back to the starting point of the stack frame and control is returned to the address in Main 18 that is saved in the Procedure 1 stack frame 16. This address is immediately after the Call Procedure 1 instruction.

An optimization can be performed on procedures known as "Leaf" procedures. A leaf procedure does not call any other procedures. FIG. 3 is a diagram of a call tree, according to the prior art. In the figure, Main calls Procedure 1 (14), which calls "Procedure 2" 26. Procedure 2 calls "Procedures 3, 4, and 5," 28, 30, 32 which each return to Procedure 2. Main is located at the root of the tree, and Procedures 3,4, and 5 are leaves, because these procedures return and do not call upon other procedures.

Certain leaf procedures do not require the building of a stack frame. For example, in most Reduced Instruction Set Computer (RISC) architectures, when Main calls Procedure 1, it passes the return address in a register. Thus, there is a register devoted specifically to storing the return address from the caller. Runtime conventions specify the register in which the return pointer is to be stored. This register is called the linkage register. If Procedure 1 doesn't need to use this register for other purposes, it can simply hold onto that address in the linkage register for use when Procedure 1 returns.

FIG. 4 is a diagram showing an optimized leaf procedure, according to the prior art. If Procedure 1 (36) has enough registers to store all of its local variables and does not make any calls, it may have no need to build a stack frame. This type of procedure is called a simple procedure. A first optimization that can be performed on a simple leaf procedure is not to build a stack frame. Main 34 stores the return pointer 38 in the linkage register 40, and a simple return is performed after execution of Procedure 1.

Another type of optimization is performed on a recursive procedure. A recursive procedure calls itself. FIG. 5 is a diagram showing a recursive procedure, according to the prior art. In the figure, the code 42 for Procedure 1 includes a call 44 for Procedure 1. A stack frame 46 is built for the first invocation of Procedure 1. When Procedure 1 calls itself, it builds another Procedure 1 stack frame 48.

Each invocation of Procedure 1 results in the building of another, nested Procedure 1 stack frame 50. The call to itself is typically nested in some conditional expression 52, such as "if n=0, call myself." When the condition "n≠0" is reached, the recursion finishes, and the Procedure 1 stack frames sequentially return and deconstruct.

A call occurring immediately before a return instruction is known as a "tail call" 56. A second optimization is known for a tail call in a recursive procedure. In such case, a procedure can use the previous invocation's stack frame.

FIG. 6 is a diagram showing tail recursion elimination, according to the prior art. In the figure, a stack frame 60 is built on the first call 62 of Procedure 1. If the next call 64 of Procedure 1 is a tail call, stack frame 60 is re-used. This continues for each subsequent tail call 66 of the recursive procedure. This can result in a substantial savings in memory, and in the time required for frame construction and deconstruction.

The tail recursion elimination is accomplished by performing a code transformation. While this code transformation is typically done on the machine code, it can also be done on the source code, as is shown in FIG. 7. In the figure, the code 72 for Procedure 1 70 includes a call to itself 74 and a return instruction 76.

The only reason to construct a new stack frame in such a recursive tail call is for storing the return address. In tail recursion elimination, the call and return instructions are transformed to a "goto Procedure 1" 78 instruction. Because the previous invocation includes both the recursive call and a return instruction to be executed at the completion of the procedure, the recursive call is thereby turned into a loop. Subsequent invocations of Procedure 1 do not return, so the new stack frames can be eliminated.

However, the prior art optimization techniques have limited application. The leaf optimization eliminates the stack frames of simple procedures that do not call any other procedures. Tail recursion elimination is performed only on procedures having recursive tail calls. Because a procedure having a recursive tail call is not a leaf procedure, the leaf optimization technique cannot also be performed. Furthermore, the prior art techniques do not significantly improve performance for certain "virtual" procedures in some object-oriented programming languages, such as C++.

It would therefore be an advantage to provide a general method and apparatus for stack frame elimination for simple procedures with tail calls. It would be a further advantage if such method and apparatus also improved performance in object-oriented programming languages.

SUMMARY OF THE INVENTION

The invention relates to a method and apparatus for stack frame elimination for simple procedures with tail calls, for example in a compiler. The invention may be used to optimize a procedure wherein all calls are tail calls. Additionally, the procedure's stack frame must be used solely for storing the incoming value of the return pointer and can store no local variables. Finally, the procedure must not use the linkage register for any purpose other than as the linkage register for calls out from the procedure.

Once these constraints are met, the invention modifies the procedure by converting all tail calls to direct branches. The linkage register is not modified. The code in the computer program for constructing and deconstructing the stack frame is eliminated. In a preferred embodiment of the invention, dead code elimination is performed on code rendered unreachable by the transformation. In an alternative, equally preferred embodiment, dead code is retained in the computer program.

An initial stack frame includes a call to a first procedure stack frame. The first procedure includes one or more tail calls, exclusively, and does not need to maintain a unique stack frame of its own. A first procedure tail call to a second procedure is transformed to a "Goto" instruction to the second procedure. The first procedure shares the initial stack frame. Any code for constructing and deconstructing the first procedure stack frame is eliminated. Thus, when the second procedure has executed, there is no need to return to a point in the first procedure whose only remaining function is to deconstruct its stack frame and return to the initial procedure.

BRIEF DESCRIPTION OF THE DRAWINGS

FIG. 3 is a diagram of a call tree;

FIG. 4 is a diagram showing an optimized leaf procedure;

FIG. 5 is a diagram showing a recursive procedure;

DETAILED DESCRIPTION OF THE INVENTION

The invention is a compiler method and apparatus for stack frame elimination for simple procedures with tail calls. In a preferred embodiment of the invention, a procedure can be optimized if it satisfies certain constraints. First, all calls out from the procedure must be tail calls. Second, the procedure's stack frame must be used solely for storing the incoming value of the return pointer and can store no local variables. Finally, the procedure must not use the linkage register for any purpose other than as the linkage register for calls out from the procedure.

Once these constraints are met, the invention modifies the procedure by converting all tail calls to direct branches. The linkage register is not modified. The code for constructing and deconstructing the stack frame is eliminated. Dead code elimination is then optionally performed on code rendered unreachable by the transformation.

Figure 1:
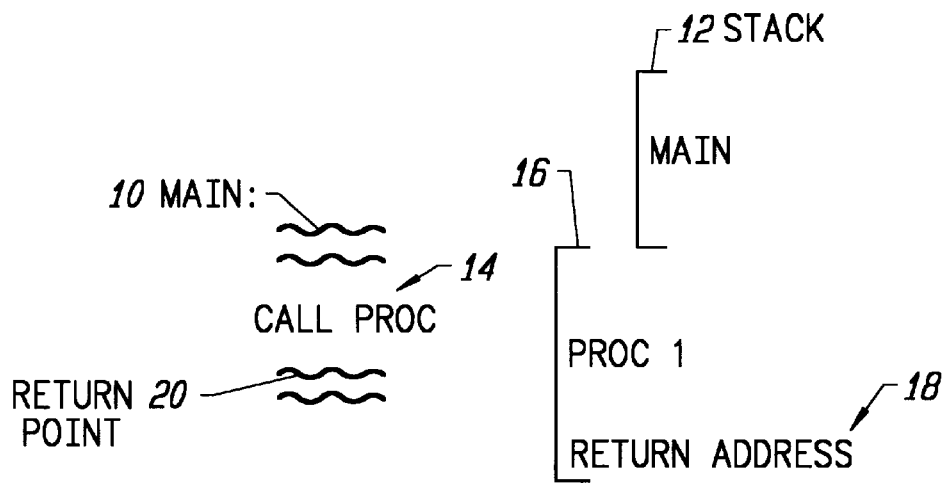
FIG. 1 is a diagram of code showing a procedure call.
Figure 2:
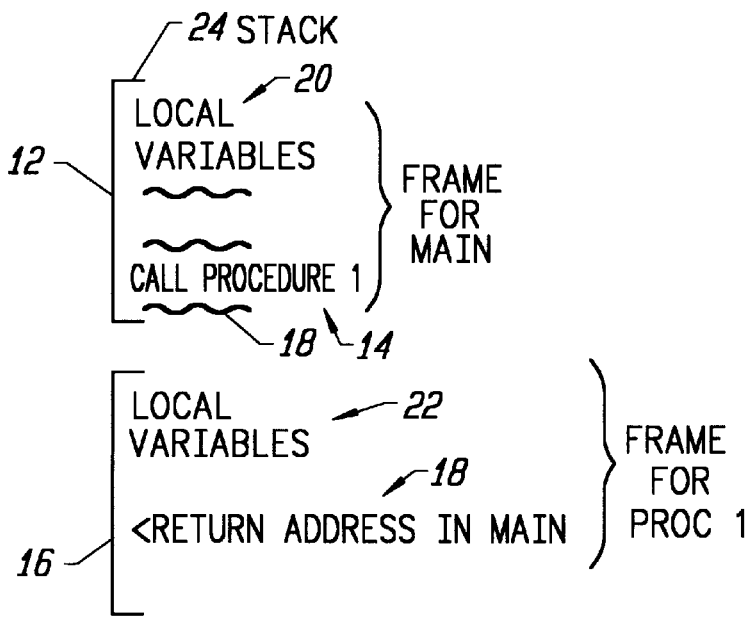
FIG. 2 is a stack layout diagram.
Figure 6:
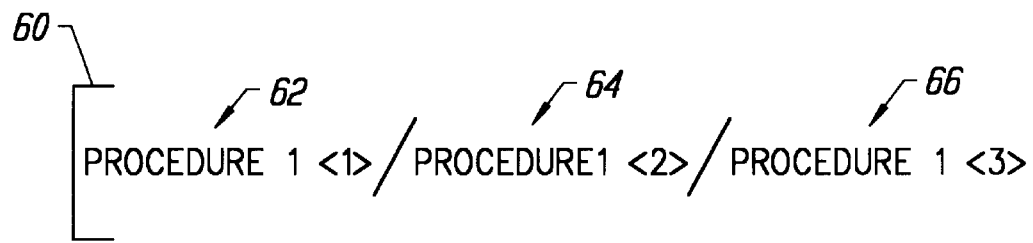
FIG. 6 is a diagram showing tail recursion elimination.
Figure 7:
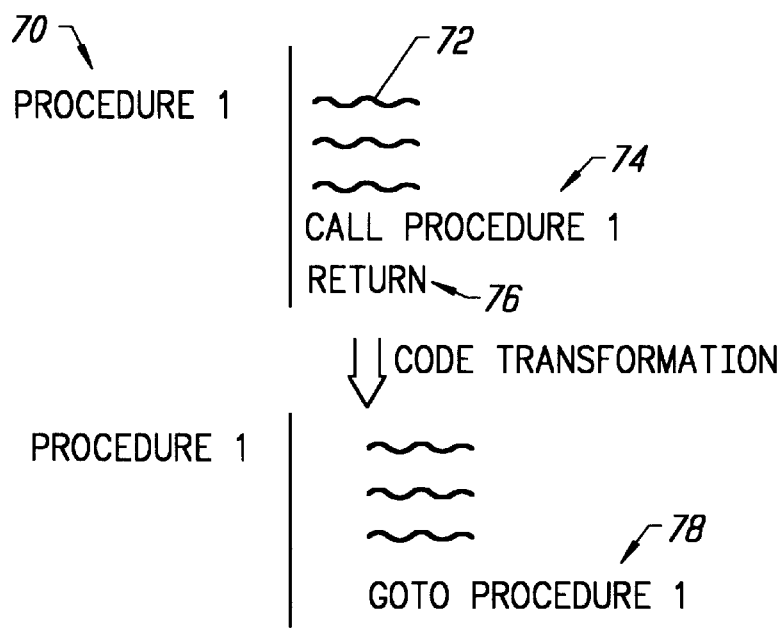
FIG. 7 is a diagram of a source code transformation.
Figure 8:
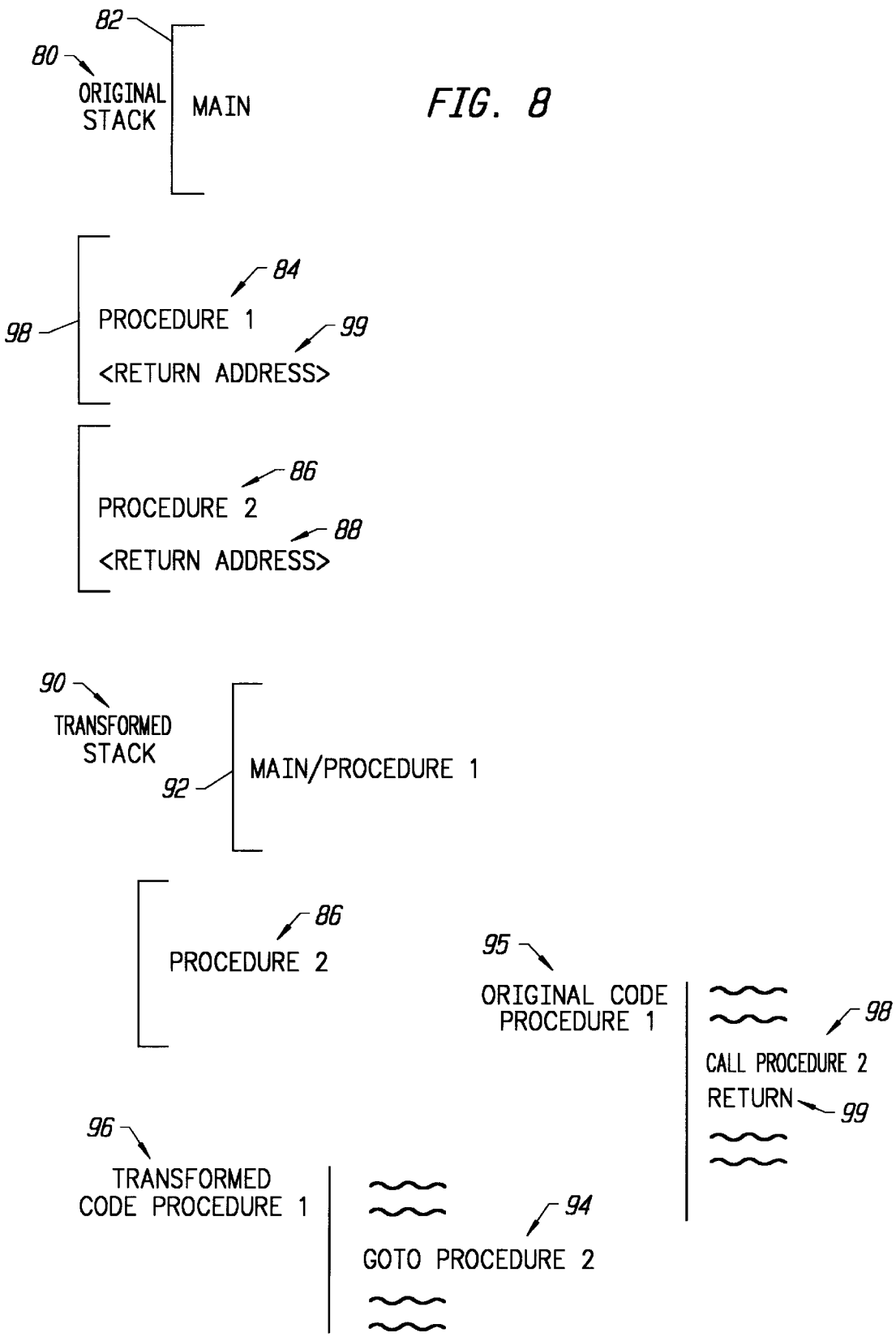
FIG. 8 is a diagram showing frame elimination according to the invention.

FIG. 8 is a diagram showing frame elimination according to the invention. In the original stack 80, the Main procedure includes a call to Procedure 1. Procedure 1 is a simple procedure with tail calls that doesn't need to maintain a unique stack frame of its own. In turn, Procedure 1 includes a call to Procedure 2. The Procedure 1 stack frame 84 includes a return address 99 to its caller, Main. The Procedure 2 stack frame includes a return address 88 to its caller, Procedure 1.

The original stack 80 is transformed such that Procedure 1 shares the Main stack frame 92. Procedure 2 builds and maintains its own stack frame 86. The original code 95 for Procedure 1 is changed from the original call to Procedure 2 instruction 98 and a return to Main 99 to a "Goto Procedure 2" instruction 94. Thus, when Procedure 2 has executed, there is no need to return to a location in Procedure 1 whose only remaining function is to deconstruct its stack frame and return to Main.

To use this optimization, Procedure 1 must be a simple procedure, having no local variables except for those which can be maintained in registers. This is because Procedure 1 uses the Main stack frame, rather than a stack frame of its own. Procedure 1 may not modify the Main stack frame, because such modification would corrupt invocation-specific information for the Main procedure. Therefore, Procedure 1 may not maintain local variables in the Main stack frame.

During the compilation of the code, only one procedure at a time should be considered in isolation. The other procedures may be coming from libraries, or are compiled separately. Procedure 2 and Main do not know that Procedure 1 is being compiled differently, using the invention. Procedure 2 and Main are compiled in the same manner as they would usually be compiled.

Figure 9:
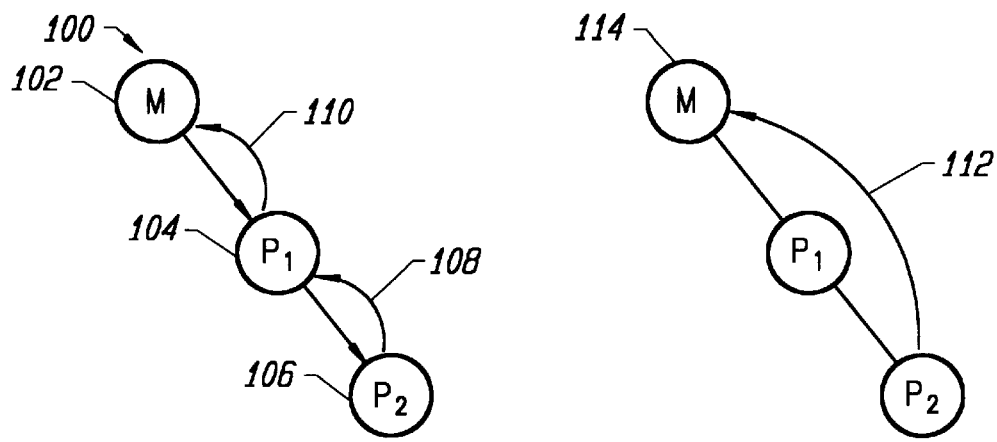
FIG. 9 is a diagram of call/return chain modification according to the invention.

FIG. 9 is a diagram of a call/return chain modification according to the invention. In the original chain 100, Main 102 calls Procedure 1 104, which then calls Procedure 2 106. At its conclusion, Procedure 2 returns 108 to Procedure 1, which returns 110 to Main. However, in the transformed chain 114, Procedure 2 directly returns 112 to Main, bypassing Procedure 1. The invention therefore not only saves memory, it saves time by eliminating a return branch back through Procedure 1.

The invention is used to advantage to optimize programs in object-oriented languages, such as C++. One such example is a C++ member function. C++ is organized into objects. An object is a data structure plus some functions that act on that data structure. These functions are called member functions.

One common type of member function is the virtual member function. A virtual member function varies across objects of that type, but has the same name. A virtual member function is often a "wrapper" around a common member function.

However, it is difficult to use inlining with a virtual member function. This is because the actual procedure to be called depends on the object, and the object can vary dynamically. A one-time transformation of a static compilation system is therefore inadequate to represent the dynamic function selection. By contrast, the invention can readily be used to optimize a virtual member function.

For example, in the member function:

Procedure $1_a${return Procedure 2(3)}, (1)

Procedure $1_a$ (Procedure 1 specialized for object a) returns Procedure 2, applied to the argument "3".
However, in the member function:

Procedure $1_b${return Procedure 2(7)}, (2)

Procedure $1_b$ (Procedure 1 specialized for object b) returns Procedure 2, applied to the argument "7". The actual body of this member function is very small. Using prior art techniques, this body is "inlined" at the call sites by putting it directly into the code. Thus, the call to member function (1) is transformed from:

Call Procedure $1_a$ (3)

to

Call Procedure 2(3). (4)

However, where virtual member functions are concerned, the specialization varies at runtime depending on the object involved. Thus, in the above example, a complier would not be able to inline the call to Procedure 1 at call sites where it could be specialized to different objects.

The procedure to be optimized according to the invention must not use the linkage register for any purpose other than as the linkage register in calls out from the procedure. In a RISC architecture, one register is typically reserved for a linkage register. Thus, the source code:

"Call Procedure 1" (5)

generates the object code:

"B, L Procedure 1, %rp" (6)

indicating a branch and link to Procedure 1 using the linkage register % rp. This object code causes the program counter to be loaded with the address of Procedure 1 and register % rp to be loaded with the address of the next instruction to be executed in the calling procedure.

If Procedure 1 has a large demand for local variables, it may not want to keep return address stored in % rp, because this monopolizes the register. Procedure 1 can use % rp as local variable storage as long as the return address is stored where it can be found. Thus, the return address is put in the stack frame. In a leaf routine, it is not desirable to store the return address in a stack frame, because the objective is to eliminate the stack frame. In a routine that makes other calls, the return address is typically stored in the stack frame to free the linkage register for other uses.

Code that has calls out to other procedures and that uses the linkage register to maintain a local variable cannot be optimized using the invention, unless the local variable can be maintained in some other register. If the situation requires the linkage register to be used for a local variable, the return address must be stored in the stack frame. However, the stack frame may not be used to store the return address because Procedure 1 shares the Main stack frame.

In an alternate embodiment of the invention, the procedure is coded with a core register selection and the linkage register is used for a local variable when another register could have been used instead. In such a case, the register selection can be shuffled so that the linkage register does not have to be used for a local variable. In this case, the invention can be used to optimize the program.

The linkage register can be used as the linkage register in calls out from the procedure. This is because the code transformation changes all instructions that have the branch-and-link to direct branches without a link. The linkage register is therefore no longer used.

Figure 10:
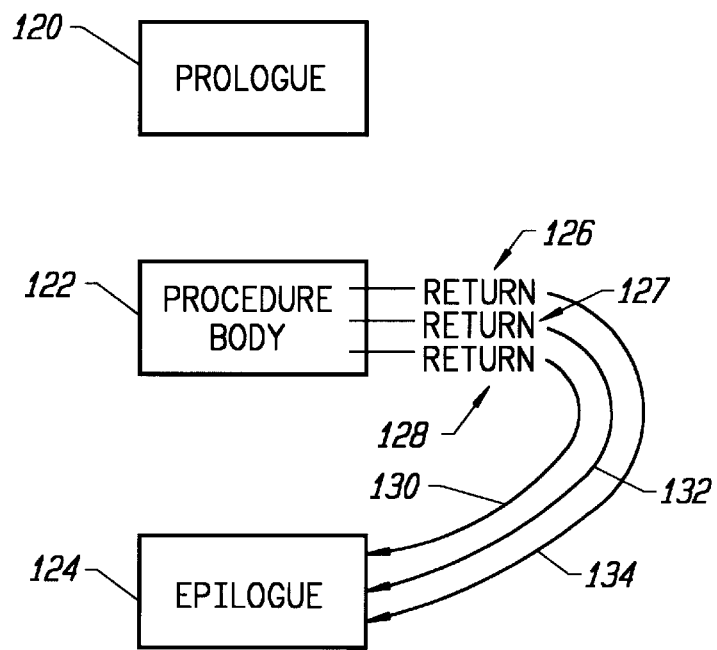
FIG. 10 is a diagram of procedure structure in object code.

In optimizing a procedure by converting all tail calls to direct branches and by eliminating the code for constructing and deconstructing the stack frame, the invention may expose some code in the original procedure that is no longer reachable. In source code, a tail call in a procedure means that a return immediately follows the branch and link. However, the procedure structure is different in object code. FIG. 10 is a diagram of procedure structure in object code according to the invention.

In object code, a procedure typically contains a prologue, a procedure body, and an epilogue. The prologue 120 sets up a stack frame and performs housekeeping functions necessary to start a new procedure invocation. The procedure body 122 includes the code for the procedure. The epilogue 124 is responsible for deconstructing the stack frame and returning to the caller.

Because the invention eliminates a portion of the stack structure, the code in the prologue and epilogue that supports the frame construction and deconstruction is not required. This is one source of "dead code." If a straight-line procedure is being optimized, there may be little or no dead code to eliminate. However, in a more complicated procedure, the procedure body may contain multiple returns 126, 128, 130. In the object code, each of these returns is coded as a branch 130, 132, 134 to the epilogue. Where these returns follow a tail-call, these extra branches to the epilogue may constitute another source of dead code.

Figure 11:
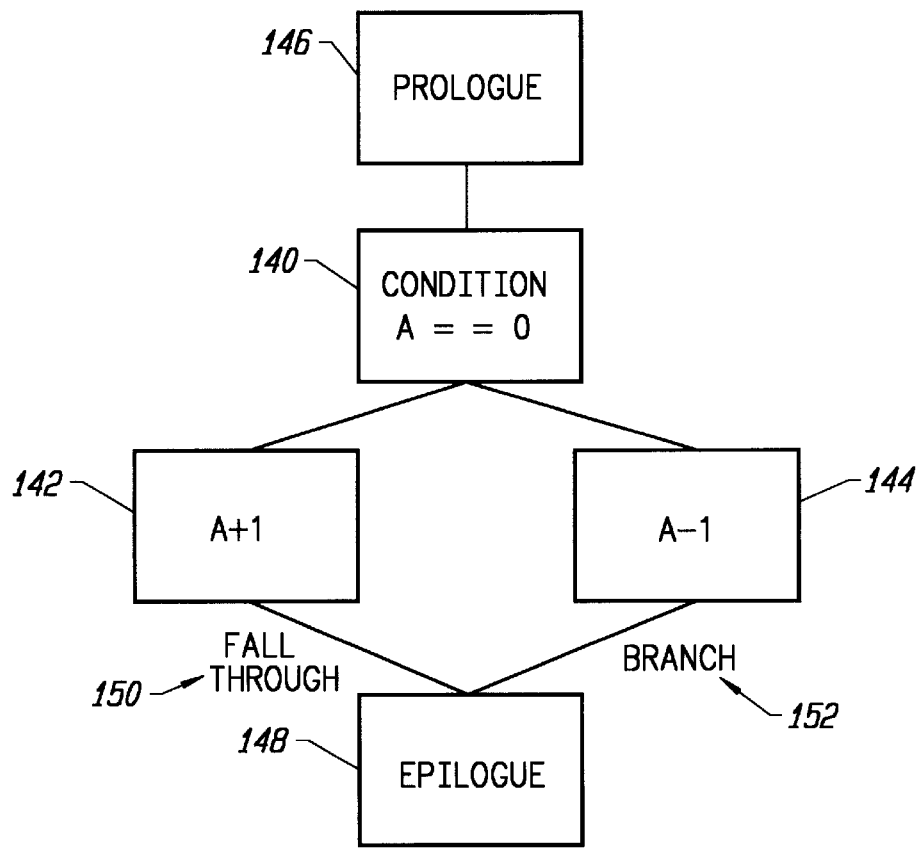
FIG. 11 is an example of unreachable dead code according to the invention.

FIG. 11 is an example of unreachable dead code, according to the invention. In the figure, there is code for a Procedure 1 136 taking an integer argument 138 "A." The procedure also includes a condition 140 and a return 142 of Procedure 2 applied to A+1. There is also a return 144 of Procedure 2 applied to A−1. Because each return immediately follows the call to Procedure 2, the procedure contains two tail calls.

However, because of the "if . . . else" clause, in the object code, a single epilogue is preceded by two blocks. The Prologue 146 is followed by the user code block 140 containing the condition. Two blocks are branched out of the condition. When the condition is true, block 142 returns Procedure 2 applied to A+1. When the condition is false, block 144 returns Procedure 2 applied to A−1. These two blocks are joined to the epilogue 148.

While one of these blocks can fall through 150 to the epilogue, the other must have a branch 152 to the epilogue, because the code is laid out in a linear fashion. In such a case, the branch comprises extra dead code. Such unreachable dead code is removed in one preferred embodiment of the invention. However, in another, equally preferred embodiment, the dead code is retained.

Although the invention is described herein with reference to the preferred embodiment, one skilled in the art will readily appreciate that other applications may be substituted for those set forth herein without departing from the spirit and scope of the present invention.

For example, the invention can be used with any one, or more procedures within a program that meet the requisite criteria. The invention is used at any point in the program at which the qualifying procedure is located.

One skilled in the art can readily provide the source code required to construct the invention using well-known programming techniques and equipment. This includes the code required to convert all tail calls to direct branches, the code for eliminating the construction and deconstruction of the stack frame, and the code for eliminating dead code.

The invention is applicable to any compiler-based computer programming languages for use on different types of computers, including network servers, and desktop computers.

Accordingly, the invention should only be limited by the Claims included below.

I claim:

1. In a computer implemented process including a simple procedure having no local variables, a method for stack frame elimination, comprising the steps of:

converting a tail call in said procedure to a direct branch; and eliminating code in said procedure for constructing and deconstructing said stack frame;

wherein said procedure is a virtual member function.

2. The method of claim 1, further comprising the step of eliminating dead code in said procedure.

3. The method of claim 1, wherein said step of converting a tail call comprises the step of transforming said tail call to a Goto instruction.

4. The method of claim 1, wherein said procedure is coded with a core register selection and uses a linkage register as a temporary value.

5. In a computer implemented process including a procedure having tail calls exclusively, and having a stack frame used solely for storing an incoming value of a return pointer, said procedure using a return pointer register only as a link register in calls out from said procedure, a method for stack frame elimination, comprising the steps of:

converting each of said tail calls in said procedure to a direct branch; and eliminating code in said procedure for constructing and deconstructing said stack frame;

wherein said procedure is a virtual member function.

6. The method of claim 5, further comprising the step of eliminating unreachable code in said procedure.

7. The method of claim 5, wherein said step of converting a tail call comprises the step of transforming said tail call to a Goto instruction.

8. The method of claim 5, wherein said procedure is coded with a core register selection and uses a linkage register as a temporary value.

9. A compiler for stack frame elimination in a computer program stack, said stack comprising a first stack frame including a call to a first procedure, said first procedure being a simple procedure that is a virtual member function with a tail call to a second procedure, said first procedure having a return address to said first stack frame, said compiler comprising;

means for transforming said first procedure to share said first stack frame;

means for converting said tail call to a direct branch; and means for eliminating any code in said computer program for constructing and deconstructing a first procedure stack frame;

wherein said transforming means is a software module.

10. The compiler of claim 9, further comprising means for eliminating unreachable code in said computer program.

11. The compiler of claim 9, wherein said means for converting said tail call comprises a module for transforming said tail call to a Goto instruction.

12. The compiler of claim 9, wherein said procedure includes a plurality of calls, said calls being exclusively tail calls.

* * * * *